United States Patent [19]

Watanabe et al.

[11] Patent Number: 4,695,504

[45] Date of Patent: Sep. 22, 1987

[54] THICK FILM RESISTOR COMPOSITION

[75] Inventors: Hirotoshi Watanabe, Kadoma; Osamu Makino; Toru Ishida, both of Hirakata, all of Japan

[73] Assignee: Matsushita Electric Industrial Co., Ltd., Osaka, Japan

[21] Appl. No.: 875,872

[22] Filed: Jun. 18, 1986

[30] Foreign Application Priority Data

| | | | |
|---|---|---|---|
| Jun. 21, 1985 | [JP] | Japan | 60-136411 |
| Oct. 4, 1985 | [JP] | Japan | 60-222231 |
| Mar. 10, 1986 | [JP] | Japan | 61-51705 |

[51] Int. Cl.[4] .......... B32B 3/00; H01B 1/06

[52] U.S. Cl. .......... 428/209; 428/210; 428/901; 252/518; 252/519; 252/521; 427/101; 427/102; 427/126.2; 427/126.1; 427/376.2; 338/308; 338/309; 29/610 R; 29/620

[58] Field of Search .......... 252/518, 519, 521; 428/209, 210, 901, 469, 471, 428, 432; 427/101, 126.1, 126.2, 126.6, 376.2; 29/610 R, 620, 621; 338/20, 308, 309, 332; 106/1.05

[56] References Cited

U.S. PATENT DOCUMENTS

| | | | |
|---|---|---|---|
| 4,039,997 | 8/1977 | Huang et al. | 338/308 |
| 4,119,573 | 10/1978 | Ishida et al. | 252/519 |
| 4,512,917 | 4/1985 | Donohue | 252/518 |
| 4,597,897 | 7/1986 | Donohue | 252/518 |

*Primary Examiner*—J. L. Barr

*Attorney, Agent, or Firm*—Wenderoth, Lind & Ponack

[57] ABSTRACT

A thick film resistor composition, comprising a silicide powder composed of a molybdenum disilicide, a tantalum disilicide and a magnesium silicide, and an alkaline earth borosilicate glass powder dispersed in a vehicle containing a heat-depolymerizing organic polymer. The thick film resistor composition, employing this heat-depolymerizing organic polymer, can be fired in a non-oxidizing atmosphere and coexist with base metal materials such as copper electrodes. Owing to the $Nb_2O_5$ and $Ta_2O_5$ contained in the alkaline earth borosilicate glass powder, the thick film resistor composition is free from sheet resistivity fluctuation, according to resistor length, which would result from diffusion of the electrode material into the resistor.

20 Claims, 1 Drawing Figure

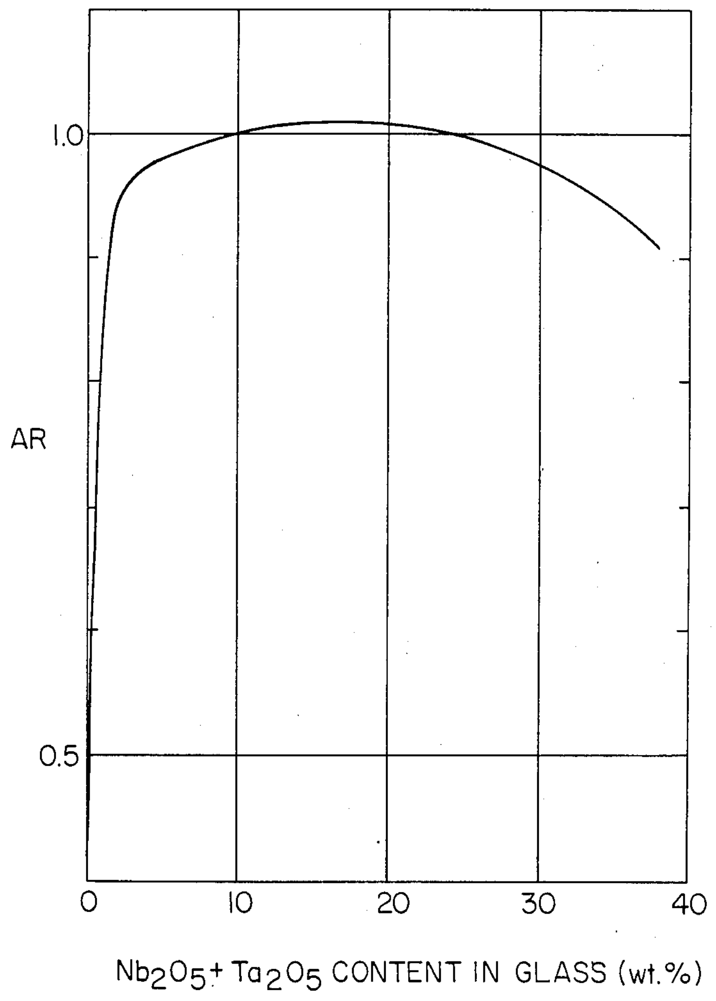
1.0
AR
0.5
0
10
20
30
40
Nb2O5+Ta2O5 CONTENT IN GLASS (wt.%)

THICK FILM RESISTOR COMPOSITION

BACKGROUND OF THE INVENTION

1. Field of the Invention

The present invention relates to a thick film resistor composition, and more specifically to a thick film resistor composition which can be formed on a ceramic wiring substrate.

2. Description of the Prior Art

Recently, the demand for smaller and multi-functional devices has been increasing. To meet this demand, integration of circuits and high density mounting of circuit components have become important technologies. The industry has become interested in thick film elements in view of their ease of mounting on wiring substrates and their compactness, particularly for passive elements such as resistors and capacitors.

Among the thick film elements, the conventional thick film resistor comprises ruthenium dioxide as the electroconductive phase and lead borosilicate glass as the inorganic binder fixing the resistor to the ceramic substrate.

The ruthenium dioxide resistor is formed by the conventional thick film production process which basically consists of screen printing, drying and firing, as briefly explained below.

In the screen printing, a resin resist is coated on a stainless steel mesh, and the resin resist is then partially removed to form a necessary pattern on the mesh screen. A thick film paste is then injected, using a squeegee, onto a substrate through an open pattern of the screen. The necessary pattern is thus transferred to the substrate. After this printing process, the film on the substrate is dried at 100°-150° C. to evaporate the solvent contained in the composition. The film on the substrate is then fired at a peak temperature between 600° and 1,000° C. in air. During this firing, the organic polymer, which makes the composition suitable for screen printing, is oxidized and decomposed as the temperature rises. In due course, the glass, an inorganic binder, is softened and melted. By the time the temperature drops from the peak to normal, the melted glass has again solidified, whereby the composition retains the electroconductive phase in the glass matrix and is fixed to the substrate. The ruthenium dioxide resistor employs silver or palladium as the electrode, because it is fired in air.

Accordingly, the conventional thick film system using a ruthenium dioxide resistor material requires precious metal for the resistor and conductor composition which is very expensive. In addition, a protective film and other various measures are needed to prevent silver migration or melting into the solder during soldering.

Inexpensive base metal material such as copper is virtually free from migration and has low resistivity, and therefore is a superior electrode material. However, at the firing temperature in air for the ruthenium dioxide thick film resistor material, copper is oxidized and loses its property as an electrode material. If the ruthenium dioxide material is fired in a nonoxidizing atmosphere, it is reduced to metallic ruthenium, which is not suitable for use in a resistor. Thus it is quite difficult for a ruthenium dioxide thick film resistor composition to coexist with a base metal resistor material such as copper.

U.S. Pat. No. 4,039,997 (Cornelius et al.) discloses a thick film resistor composition that can coexist with copper or the like base metal material. According to this patent, molybdenum disilicide or tungsten disilicide is used for the electroconductive phase, and barium borosilicate glass for the glass phase. The thick film resistor composition by Cornelius et al. is, however, disadvantageous in that it involves a very high firing temperature of 970°-1,150° C., shortening the service life of the furnace in actual manufacture.

Furthermore, since commercially available thick film conductor material for copper electrode requires a firing peak temperature of 900° C., two furnaces with different peak temperatures must be prepared or the peak temperature must be changed if one furnace is used, to produce the thick film resistor composition by Cornelius et al. This would result in over-investment and inefficient production. Besides, the glass powder used in the thick film resistor composition by Cornelius et al. has a very small particle size (in the order of 1-2 $\mu$m). Accordingly, when the composition is fired in a nonoxidizing atmosphere, the surface of the glass powder is melted, trapping the organic polymer in the form of carbon in the resistor before the organic polymer is thermally decomposed and dispersed. This results in an unstable temperature coefficient of the resistor and diminished moisture-resistance. If the particle size of the silicide powder in the composition is larger than 1 $\mu$m, their radius becomes excessive compared to that of the glass particles, which inversely affects the wettability as between the glass particles and silicide particles, increasing the number of voids in the sintered resistor. Consequently, when the composition is fired, the conductor material to be connected to the resistor diffuses in the thick film resistor via thermal diffusion, causing unstable sheet resistance in the sintered resistor.

U.S. Pat. No. 4,119,573 (Ishida et al.) also discloses a thick film resistor composition employing molybdenum disilicide, magnesium silicide, tantalum disilicide or manganese silicide as an electroconductive phase, and barium borosilicate glass containing equal to or less than 7 wt % niobium pentoxide as an inorganic binder. The composition of Ishida et al. is dispersed in a vehicle (in which ethyl cellulose is dissolved) and injected via the screen printing method to form a film on the ceramic substrate and is then fired onto the substrate in a nonoxidizing atmosphere. However, it is difficult to achieve the desired resistor property using the composition of Ishida et al. for the following reason: since ethyl cellulose has thermal oxidation and decomposition properties, it turns to carbon when exposed to a high temperature in a nonoxidizing atmosphere of extremely small oxygen content. The ethyl cellulose thus remains in the form of carbon residue in the sintered resistor, diminishing the resistor properties.

If a thermally decomposable organic polymer is used in the composition by Ishida et al. (glass+silicide) for screen printing and fired in a nonoxidizing atmosphere, the resulting product exhibits large fluctuations in resistance value, which remains a problem to be solved before practical application. In addition, the sheet resistivity varies depending upon the aspect ratio (length/width) of the resistor film, which significantly hampers resistance value design. Analysis of the resistor film via an X-ray diffraction meter has revealed that unnecessary reaction takes place in the interface between electrode material and resistor during firing in a nonoxidizing atmosphere. The above resistance fluctuation is presumably caused by the resistance variation.

When the resistor is left for a long time in a hot and highly humid atmosphere, the sheet resistivity increases, particularly in the resistor surface. This results in significant resistance fluctuation, making it unsuitable for practical use.

The above increase in sheet resistivity is presumably caused by a thermochemical reaction between the silicide powder and moisture on the resistor surface.

U.S. Pat. No. 4,512,917 (Donohue) discloses a thick film resistor composition using a boride, such as lanthanum boride, as the electroconductive phase, instead of silicide. This composition is dispersed in vinyl acetate resin. In this case as well, however, when the resistor composition is fired in a nonoxidizing atmosphere, carbon remains in the composition owing to the properties of the resin. As a result, resistance is diminished, particularly in the region of high resistance, where the glass phase content is relatively large.

SUMMARY OF THE INVENTION

It is an object of the present invention to provide a thick film resistor composition which can be fired in a nonoxidizing atmosphere and used for producing, through an effective firing profile (at a peak temperature of 850° to 965° C.), an inexpensive resistor with stable moisture resistance property and which can coexist with a base metal conductor material such as copper.

To achieve this object, a composition of the present invention comprises a silicide as an electroconductive phase, with a glass as an inorganic binder for retaining the electroconductive phase and fixing the resistor onto a ceramic substrate, the silicide and the glass in powder forms being dispersed in a vehicle in which a heat-depolymerizing organic polymer is dissolved, the crystalline glass being preferably an alkaline earth borosilicate glass containing 8–20 wt % niobium pentoxide.

The heat-depolymerization is a property of resins such as polymethylmethacrylate, which begins decomposing when heated. Many acrylic resins have this property.

Among the acrylic resins, polymethylmethacrylate is one of the most easily depolymerized by heat. In a nonoxidizing atmosphere, it is decomposed to virtually pure methyl methacrylate when heated, without leaving a carbon residue.

As disclosed in U.S. Pat. No. 4,512,917, however, polymethylmethacrylate dissolves only in a low grade alcohol or ketone. If the electroconductive powder and glass powder are dispersed in a vehicle containing the dissolved low grade alcohol or ketone, it is impossible for the vehicle to long maintain a viscosity suitable for the screen printing, due to the highly volatile solvent.

On the other hand, heat-depolymerizing n-butyl methacrylate or iso-butyl methacrylate, which dissolves in a polyhydric alcohol such as terpineol, or in ethyl cellosolve or like solvent witha high boiling point, can serve in a vehicle which long maintains viscosity suitable to the screen printing.

Considering the carbon residue resulting from the firing in the nonoxidizing atmosphere, copolymer of isobutyl methacrylate and methylmethacrylate with a mixing ratio of 6:4 to 8:2 is most preferable.

In the present invention, the silicide as the electroconductive phase is preferably composed of a 0–40 mol % of molybdenum disilicide and 100–60 mol % of mixture of tantalum disilicide and magnesium silicide. The mixing ratio by mol of the tantalum disilicide and the magnesium silicide is 9.5:0.5 to 5:5. Another silicide preferable as the low resistance electroconductive phase is composed of 10–90 mol % of cobalt silicide and 90–10 mol % of nickel disilicide.

It is preferable that the silicide powder and the glass powder have mean particle sizes of at most 1 μm and 2–6 μm, respectively, in consideration of the following points:

(1) In a thick film resistor, the electroconductive phase is formed around an irregular matrix of the dispersed glass particles.

(2) To minimize carbon residue, the organic polymer must decompose and disperse before the glass surface melts and the silicide particles form a network.

(3) It is essential to prevent unnecessary thermal diffusion and reaction with the silicide of the base metal conductor to be connected with the resistor.

With the above construction, the thick film resistor composition of the present invention can form a resistor capable of coexisting with the base metal material such as copper conductor, and in which unnecessary thermal diffusion of the base metal material and unnecessary reaction between the base metal material and the silicide are prevented.

In addition, according to the present invention, it is possible to prevent carbon residue, which most seriously affects resistance generation during the firing in the nonoxidizing atmosphere. Accordingly, inexpensive resistors of stable moisture resistance can be produced with the effective firing profile.

BRIEF DESCRIPTION OF THE DRAWINGS

FIG. 1 is a graph showing a relationship between the AR and the $Nb_2O_5+Ta_2O_5$ content in glass.

The AR represents a ratio of a sheet resistivity $R_{0.5}$ (Ω/□) for an electrode-to-electrode distance of 0.5 mm to a sheet resistivity $R_{10}$ for an electrode-to-electrode distance of 10 mm when the width of the resistor is 1 mm. That is, $AR=R_{0.5}/R_{10}$.

DESCRIPTION OF THE PREFERRED EMBODIMENT(S)

The glass frit used in the present invention is obtained by the normal glass manufacturing process. Specifically, a mixture of barium carbonate, boric acid, magnesium oxide, calcium carbonate, silicon dioxide and aluminium oxide, as a starting material, is heated until it completely melts at 1,200°–1,300° C. in air. The resultant molten material is poured into pure water for quenching and crushed to coarse particles, which are then wet-milled in a ball mill, using methyl alcohol as a solvent.

When measured by a coulter counter, the glass frit thus produced had a mean particle size of 2–6 μm.

The silicide powder used in the present invention is obtained by the process disclosed in U.S. Pat. No. 4,119,573. That is, the desired starting powder is exposed to a temperature of 1,200°–1,400° C. in an Ar atmosphere for solid phase reaction, crushed to coarse particles and milled in a ball mill. The mean particle size of the silicide powder thus obtained was less than 1 μm.

The glass powder for use in the present invention is an alkaline earth borosilicate glass, preferably composed of at least 30–50 wt % of barium oxide, calcium oxide or strontium oxide, 30–50 wt % of boron oxide, 2–10 wt % of silicon dioxide, 0–15 wt % of aluminum oxide and 0–15 wt % of magnesium oxide. Niobium pentoxide and tantalum pentoxide were added to this.

The vehicle in which the silicide powder and glass frit were to be dispersed was obtained by dissolving the copolymer of iso-butyl methacrylate and ethyl methacrylate by 10–25 wt % in terpineol.

The thick film resistor composition comprises the above silicide powder and glass frit, dispersed in the above vehicle. For pattern formation by the screen printing method, the composition has a viscosity as presented in U.S. Pat. No. 4,512,917.

The thus obtained composition was squeezed for printing through a 325 mesh/inch stainless steel screen onto an alumina substrate on which copper electrodes had been provided in advance. After 10 minute's drying at 120° C., the composition on the substrate was fired in a furnace at a temperature profile of 850°–965° C. peak temperature in a nitrogen gas atmosphere, with 10 minute retention time and a total firing period of 60 minutes.

EXAMPLE 1

Various resistor properties of the thick film resistor thus produced are shown in Tables 1 and 2.

Table 1 (Sample Nos. 1 to 9) shows the properties of thick film resistors with the mol ratio of tantalum disilicide to magnesium silicide varying from 9.5:0.5 to 5:5, the molybdenum disilicide content varying from 0 to 80 mol %, the tantalum pentaoxide+magnesium silicide content varying from 100 to 20 mol %, the niobium pentoxide content in the glass being fixed at 8.0 wt %. Table 2 (Sample Nos. 10 to 18) shows the properties of the thick film resistor with cobalt silicide content varying from 10 to 90 mol % and the nickel disilicide content varying from 90 to 10 mol %. The firing peak temperature was 900° C.

TABLE 1

Effect of Silicides Ratio and Content

| | Sample No. | | | | | | | | |
|---|---|---|---|---|---|---|---|---|---|
| | 1 | 2 | 3 | 4 | 5 | 6 | 7 | 8 | 9 |
| $Nb_2O_5$ Content in Glass | | | | | wt % | | | | |
| $Nb_2O_5$ | | | | | 8.0 | | | | |
| Resistor Composition | | | | | | | | | |
| $TaSi_2$:$Mg_2Si$ mol ratio | | 9.5:0.5 | | | 7.5:2.5 | | | 5:5 | |
| $\frac{\text{Silicide}}{\text{Glass + Silicide}}$ wt % | | | | | 20 | | | | |
| $MoSi_2$ mol % | 0 | 40 | 80 | 0 | 40 | 80 | 0 | 40 | 80 |
| ($TaSi_2$ + $Mg_2Si$) mol % | 100 | 60 | 20 | 100 | 60 | 20 | 100 | 60 | 20 |
| Resistor Properties | | | | | | | | | |
| Resistance, kΩ/□ | 2.34 | 0.38 | 0.16 | 3.56 | 1.76 | 0.67 | 6.23 | 3.15 | 0.87 |
| HTCR, ppm/°C. | +102 | +140 | +260 | +87 | +102 | +160 | −10 | +57 | +147 |
| STOL 625 mW/mm² 5 sec | 0.32 | 0.13 | 0.10 | 0.38 | 0.28 | 0.12 | 0.45 | 0.29 | 0.15 |
| Noise (dB) | −15 | −19 | −21 | −11 | −18 | −20 | −10 | −12 | −18 |
| Δ % 60° C., 95% RH, 500 hr | 0.8 | 0.5 | 0.3 | 0.8 | 0.6 | 0.5 | 0.9 | 0.7 | 0.6 |

TABLE 2

Effect of Silicide Ratio and Content

| | Sample No. | | | | | | | | |
|---|---|---|---|---|---|---|---|---|---|
| | 10 | 11 | 12 | 13 | 14 | 15 | 16 | 17 | 18 |
| $Nb_2O_5$ Content in Glass | | | | | wt % | | | | |
| $Nb_2O_5$ | | | | | 8.0 | | | | |
| Resistor Composition | | | | | | | | | |
| CoSi:$Ni_3Si_2$ mol ratio | | 1:9 | | | 5:5 | | | 9:1 | |
| $\frac{\text{Silicide}}{\text{Glass + Silicide}}$ wt % | 10 | 25 | 40 | 10 | 25 | 40 | 10 | 25 | 40 |
| Resistor Properties | | | | | | | | | |
| Resistance, Ω/□ | 327 | 27 | 8 | 362 | 38 | 11 | 388 | 41 | 13 |
| HTCR, ppm/°C. | +8 | +50 | +110 | +9 | +60 | +120 | +20 | +80 | +160 |
| STOL 625 mW/mm² 5 sec | 0.2 | 0.1 | 0.1 | 0.3 | 0.2 | 0.1 | 0.3 | 0.1 | 0.1 |
| Noise (dB) | −20 | −26 | <−29 | −20 | −25 | <−29 | −20 | −24 | <−29 |
| Δ % 60° C., 95% RH, 500 hr | 1.0 | 0.9 | 0.8 | 1.0 | 0.9 | 0.7 | 1.1 | 0.9 | 0.8 |

TABLE 3

Effect of High $Nb_2O_5$ Content

| | Sample No. | | | | | | | | |
|---|---|---|---|---|---|---|---|---|---|
| | 19 | 20 | 21 | 22 | 23 | 24 | 25 | 26 | 27 |
| $Nb_2O_5$ Content in Glass | | | | | wt % | | | | |
| $Nb_2O_5$ | | 8.0 | | | 15.7 | | | 19.9 | |
| Resistor Composition | | | | | wt % | | | | |
| Silicide mol ratio $MoSi_2$:$TaSi_2$:$Mg_2Si$ 2:6:2 | 10 | 25 | 40 | 10 | 25 | 40 | 10 | 25 | 40 |
| Glass | 90 | 75 | 60 | 90 | 75 | 60 | 90 | 75 | 60 |
| Resistor Properties | | | | | | | | | |
| Resistance, kΩ/□ | 223 | 0.85 | 0.45 | 30.5 | 0.72 | 0.43 | 10.2 | 0.63 | 0.41 |
| HTCR, ppm/°C. | −537 | +80 | +123 | −293 | +100 | +163 | −59 | +116 | +180 |
| STOL 625 mW/mm² 5 sec | 0.52 | 0.25 | 0.20 | 0.31 | 0.17 | 0.13 | 0.18 | 0.09 | 0.08 |
| Noise (dB) | +11 | −16 | −18 | +9 | −19 | −20 | +5 | −21 | −23 |

TABLE 3-continued

| | Effect of High $Nb_2O_5$ Content | | | | | | | | |
|---|---|---|---|---|---|---|---|---|---|
| | Sample No. | | | | | | | | |
| | 19 | 20 | 21 | 22 | 23 | 24 | 25 | 26 | 27 |
| Δ % 60° C., 95% RH, 500 hr | 3.5 | 0.7 | 0.4 | 2.1 | 0.5 | 0.3 | 1.1 | 0.4 | 0.3 |

TABLE 4

| | Effect of High $Nb_2O_5$ Content | | | | | | | | |
|---|---|---|---|---|---|---|---|---|---|
| | Sample No. | | | | | | | | |
| — | 28 | 29 | 30 | 31 | 32 | 33 | 34 | 35 | 36 |
| $Nb_2O_5$ Content in Glass | | | | | wt % | | | | |
| $Nb_2O_5$ | | 8.0 | | | 15.7 | | | 19.9 | |
| Resistor Composition | | | | | wt % | | | | |
| Silicide mol ratio CoSi:$Ni_3Si_2$ 2:8 | 10 | 25 | 40 | 10 | 25 | 40 | 10 | 25 | 40 |
| Glass | 90 | 75 | 60 | 90 | 75 | 60 | 90 | 75 | 60 |
| Resistor Properties | | | | | | | | | |
| Resistance, Ω/□ | 622 | 35 | 23 | 500 | 33 | 22 | 400 | 29 | 18 |
| HTCR, ppm/°C. | +260 | +140 | +300 | +270 | +150 | +240 | +300 | +170 | +250 |
| STOL 625 mW/mm² 5 sec | 0.3 | 0.2 | 0.1 | 0.2 | 0.2 | 0.1 | 0.2 | 0.1 | 0.1 |
| Noise (dB) | −18 | −29 | <−29 | −20 | −28 | <−29 | −25 | −28 | <−29 |
| Δ % 60° C., 95% RH, 500 hr | 1.2 | 1.0 | 0.8 | 1.1 | 0.9 | 0.7 | 1.0 | 0.7 | 0.6 |

EXAMPLE 2

Tables 3 and 4 show various resistor properties when the niobium pentoxide content in the glass powder varies from 8 to 20 wt %. The firing peak temperature was 900° C.

As is obvious from Tables 1 through 4, the resistor obtained via the present invention provides superior moisture-resistance irrespective of the composition of the silicide.

The following example verifies that niobium pentoxide and tantalum pentoxide are extremely effective in eliminating the sheet resistivity instability resulting from unnecessary reaction in the interface between resistor and electrodes.

EXAMPLE 3

As with the resistors in Examples 1 and 2, a resistor film was formed by the screen printing method. The resistor width was a constant 1 mm, and the electrode-to-electrode distance (L) was 0.5 mm or 10 mm. The sheet resistivity Rs (Ω/□) of the resistor is expressed by the formula:

$Rs=Ro/L$ ($Ro$: Resistance measured)

The ratio of sheet resistivity $R_{0.5}$ for L=0.5 mm to sheet resistivity $R_{10}$ for L=10 mm (AR) is then obtained as follows:

$$AR=R_{0.5}/R_{10}$$

Table 5 shows the various resistor properties for different contents of $Ta_2O_5$ and $Nb_2O_5$ in the glass.

As is understood from Table 5, the AR value can be made very small by the addition of $Ta_2O_5$ and $Nb_2O_5$.

The relationship between the AR value and the $Nb_2O_5+Ta_2O_5$ content in the glass is shown in FIG. 1. As shown, the AR value is stable when the $Nb_2O_5+Ta_2O_5$ content in the glass is between 2 and 30 wt %.

The effectiveness of the present thick film resistor composition has been verified using some examples as above described, but the effectiveness of the present invention is not limited to the above examples but ranges over the entire scope of the appended claims. For instance, although the firing peak temperature is limited to 900° C. in the examples, a stable thick film resistor can also be obtained using a firing peak temperature of 850°-965° C., if the composition of alkaline earth borosilicate glass is changed within the range presented in the claims.

TABLE 5

| | Sample No. | | | | | | | | |
|---|---|---|---|---|---|---|---|---|---|
| | 37 | 38 | 39 | 40 | 41 | 42 | 43 | 44 | 45 |
| $Nb_2O_5$, $Ta_2O_5$ Content in Glass | | | | | wt % | | | | |
| $Nb_2O_5$ | | 1 | | | 4 | | | 7 | |
| $Ta_2O_5$ | 1 | 8 | 15 | 1 | 8 | 15 | 1 | 8 | 15 |
| Resistor Composition | | | | | wt % | | | | |
| Silicide mol ratio $MoSi_2$:$Ta_2Si_2$:$Mg_2Si$ 2:6:2 $\frac{\text{Silicide}}{\text{Silicide + Glass}}$ | | | | | 20 | | | | |
| Resistor Properties | | | | | | | | | |
| Resistance, kΩ/□ | 7.83 | 1.13 | 0.81 | 3.13 | 0.98 | 0.62 | 1.05 | 0.72 | 0.42 |
| HTCR, ppm/°C. | −187 | +35 | +112 | +96 | +108 | +165 | +103 | +124 | +182 |
| AR | 0.97 | 0.98 | 0.98 | 0.98 | 0.98 | 0.99 | 0.99 | 0.99 | 1.00 |

What is claimed is:

1. A thick film resistor composition comprising a silicide powder and an alkaline earth borosilicate glass powder dispersed in a vehicle containing an acrylic polymer, said silicide powder being composed of 0–40 mol % of molybdenum disilicide and a 100–60 mol % of a mixture of a tantalum disilicide and a magnesium silicide, the mol ratio of said tantalum disilicide to said magnesium silicide ranging from 9.5:0.5 to 5:5, said alkaline earth borosilicate glass powder containing 8–10 wt % of niobium pentoxide.

2. The thick resistor composition as claimed in claim 1, wherein the silicide powder is composed of a solid solution.

3. The thick film resistor composition as claimed in claim 1, wherein the silicide powder mean particle size is less than 1 μm.

4. The thick film resistor composition as claimed in claim 1, wherein said acrylic polymer is an iso-butylmethacrylate resin.

5. The thick film resistor composition as claimed in claim 1, wherein said heat-depolymerizing acrylic polymer is a copolymer of iso-butyl methacrylate and methyl methacrylate in a ratio ranging from 6:4 to 8:2.

6. The thick film resistor composition as claimed in claim 1, wherein said alkaline earth borosilicate glass powder contains 1–7 wt % of niobium pentoxide and 1–15 wt % of tantalum pentoxide.

7. The thick film resistor composition as claimed in claim 1, wherein said alkaline earth borosilicate glass powder comprises 30–50 wt % of at least one of BaO, SrO and CaO, 30–50 wt % of $B_2O_3$, 2–10 wt % of $SiO_2$, 0–15 wt % of $Al_2O_3$ and 0–5 wt % of MgO.

8. The thick film resistor composition as claimed in claim 1, wherein the glass powder mean particle size is 2–6 μm.

9. A thick film resistor composition comprising a silicide powder and an alkaline earth borosilicate glass powder being dispersed in a vehicle containing a acrylic polymer, said silicide powder being composed of 10–90 mol % of cobalt silicide and 90–10 mol % of nickel disilicide, said alkaline earth borosilicate glass powder containing 8–10 wt % of niobium pentoxide.

10. The thick film resistor composition as claimed in claim 9, wherein the silicide powder is composed of a solid solution.

11. The thick film resistor composition as claimed in claim 9, wherein the silicide powder mean particle size is less than 1 μm.

12. The thick film resistor composition as claimed in claim 9, wherein said acrylic polymer is an iso-butylmethacrylate resin.

13. The thick film resistor composition as claimed in claim 9, wherein said heat-depolymerizing organic polymer is a copolymer of iso-butyl methacrylate and methyl methacrylate in a ratio ranging from 6:4 to 8:2.

14. The thick film resistor composition as claimed in claim 9, wherein said alkaline earth borosilicate glass contains 1–7 wt % of niobium pentoxide and 1–15 wt % of tantalum pentoxide.

15. A thick film resistor composition as claimed in claim 9, wherein said alkaline earth borosilicate glass comprises 30–50 wt % of at least one of BaO, srO and CaO, 30–50 wt % of $B_2O_3$, 2–10 wt % of $SiO_2$ and 0–5 wt % of MgO.

16. The thick film resistor composition as claimed in claim 9, wherein the glass powder mean particle size is 2–6 μm.

17. A method of producing a thick film resistor comprising the steps of: forming the thick film resistor composition by mixing and dispersing the powders as claimed in claim 1 or 9; forming a resistor on a ceramic substrate; and firing the formed resistor in a nonoxidizing atmosphere.

18. The method as claimed in claim 17, wherein the thick film resistor composition is fired in a nonoxidizing atmosphere at a temperature between 850° and 965° C.

19. A circuit substrate having the thick film resistor formed thereon by the process of claim 17 in such a manner that the resistor is connected with copper electrodes preliminarily provided on the ceramic substrate.

20. The circuit substrate as claimed in claim 19, wherein an alumina substrate is used as the ceramic substrate.

* * * * *